United States Patent [19]

Inoue

[11] Patent Number: 4,609,803
[45] Date of Patent: Sep. 2, 1986

[54] TW-EDM METHOD AND APPARATUS WITH A FERROMAGNETIC WIRE ELECTRODE

[75] Inventor: Kiyoshi Inoue, Tokyo, Japan

[73] Assignee: Inoue-Japax Research Incorporated, Kanagawaken, Japan

[21] Appl. No.: 611,406

[22] Filed: May 17, 1984

[30] Foreign Application Priority Data

| May 17, 1983 | [JP] | Japan | 58-85110 |
| Jul. 14, 1983 | [JP] | Japan | 58-129192 |
| Jul. 18, 1983 | [JP] | Japan | 58-131643 |
| Aug. 17, 1983 | [JP] | Japan | 58-149226 |

[51] Int. Cl.⁴ .............................................. B23H 7/04
[52] U.S. Cl. .............................. 219/69 W; 204/129.02; 204/206; 219/69 M
[58] Field of Search ............... 219/69 E, 69 M, 69 W, 219/69 S; 204/129.2, 206

[56] References Cited

U.S. PATENT DOCUMENTS

| 4,287,404 | 9/1981 | Convers et al. | 219/69 W |
| 4,341,939 | 7/1982 | Briffod et al. | 219/69 E |

FOREIGN PATENT DOCUMENTS

| 3108536 | 12/1981 | Fed. Rep. of Germany . | |
| 52-58195 | 5/1977 | Japan | 219/69 W |
| 53-49397 | 5/1978 | Japan | 219/69 W |
| 106736 | 8/1980 | Japan | 219/69 W |
| 125940 | 9/1980 | Japan | 219/69 S |
| 57-85947 | 5/1982 | Japan | 219/69 W |
| 156129 | 9/1982 | Japan | 219/69 W |
| 2069396 | 8/1981 | United Kingdom . | |
| 2096040 | 10/1982 | United Kingdom | 219/69 W |
| 2103985 | 3/1983 | United Kingdom . | |
| 2105237 | 3/1983 | United Kingdom . | |

Primary Examiner—Clarence L. Albritton
Assistant Examiner—Geoffrey S. Evans
Attorney, Agent, or Firm—Karl F. Ross; Herbert Dubno

[57] ABSTRACT

A method of and an apparatus for machining an electrically conductive workpiece with a wire electrode which is originally ferromagnetic or becomes ferromagnetic in the machining zone wherein the magnetic properties of the wire are detected as it passes out of the machining zone and the detected magnetic properties are used to control a machining parameter.

17 Claims, 6 Drawing Figures

TW-EDM METHOD AND APPARATUS WITH A FERROMAGNETIC WIRE ELECTRODE

FIELD OF THE INVENTION

The present invention relates to traveling-wire electrical discharge machining (TW-EDM), or a process of electrical-discharge machining of a conductive workpiece by means of a thin, elongate continuous electrode element (hereinafter referred to as "wire electrode" or "wire"), the wire being axially advanced from supply means to travel through a machining zone in the workpiece and to be taken up onto takeup means, in which process a succession of time-spaced electrical discharges are effected between the traveling wire and the workpiece across a machining gap in the presence of a flushing liquid medium to electroerosively remove material from the workpiece while the wire and the workpiece are relatively displaced transverse to the wire along a programmed path to advance erosive material removal through the workpiece and thereby to form a contour corresponding thereto in the workpiece.

In particular, the invention relates to the TW-EDM process of the type in which the traveling wire is ferromagnetic at least downstream of the cutting zone in its path of axial travel, and to an improved method of and apparatus for performing the process described whereby changing process conditions in the machining zone are ascertained by monitoring a property of the wire advancing out of the machining zone towards the takeup means to provide signals which can be used and adaptively control machining parameters to eliminate a possibly damaging condition for the thin wire and maintain the machining process with a high efficiency.

BACKGROUND OF THE INVENTION

In the TW-EDM art, attempts to obtain higher removal rate with due machining quality and economy, give rise to various problems vis a vis the wire electrode. The wire must be capable of carrying electrical discharge current of high amplitudes to achieve high rates of erosion and yet must be relatively thin (typically 0.05 to 0.5 mm in thickness) to assure high cutting accuracy. To allow the wire and hence the erosion to faithfully follow the programmed machining path, a high tension must be applied to the wire to maintain its active electrode length traveling through the cutting zone as straight or geometrically accurate as possible. Since the wire is consumed or "used up", it is economically desirable that it be "used up", that is, advanced to renew the active electrode surface through the cutting zone, as slowly as possible. Since the wire is thin, the cutting groove created behind the traversing wire in the workpiece is correspondingly narrow so that machining discharge products tend to accumulate in the cutting zone through which the wire travels. This tendency increases as the thickness of the workpiece or the active electrode length of the wire increases. All these factors and requirements severely affect the ability of the wire to withstand breakage. In TW-EDM, wire breakage is fatal since it interrupts the machining process. Therefore, often higher removal rates cannot be pursued without overcoming the higher risk of wire breakage which arises from the use of greater energy and higher repetition rate of machining discharge pulses are required to increase the erosion rate.

In TW-EDM, machining is considered to proceed in a normal mode when electrical discharges occur uniformly throughout the active electrode surface of the wire traveling through the cutting zone. Under an adequate set of operating parameters, the wire will not then break if machining is allowed to proceed at a maximum efficiency by permitting pulses applied to result in such random electrical discharges at a highest proportion and/or the wire to travel at a minimum speed. The wire passed out of the cutting zone can then be considered to have been truly "used up" upon removing stock from the workpiece at maximum efficiency. As long as machining proceeds in the normal mode, the pulses and the contouring feed can be enhanced to increase removal rate to a maximum level which the eventual set of operating parameters allows.

In a TW-EDM operation, however, it is practically not possible to exclude the possibility that such a normal machining mode is disturbed. Machining is more likely disturbed as higher removal is attempted during an "enhanced" machining condition whereas machining conditions are relatively "low" or safer against wire breakage at relatively low removal rates; in the latter case machining if disturbed is more likely returned spontaneously to the normal mode. Machining is considered to become disturbed if a uniform distribution of successive electrical discharges over the entire active electrode surface of the wire traveling through the cutting zone is impaired. If this condition continues or is allowed to continue, discharges tend to become "abnormal" in the cutting zone. The random electrical discharges will progressively be reduced in number and concentrate at particular sites in the cutting zone. Eventually the wire will be broken at a certain point where its strength is the weakest or it can no longer withstand excessive thermal and mechanical stresses due to the localized abnormal electrical discharges.

While it has thus been generally recognized that wire breakage is of major concern and is in effect triggered by a disturbance of the normal machining mode and an abnormal concentration of electrical discharges, difficulties have been encountered in the prior art in timely detecting a real tendency for the wire to break or properly predicting wire breakage during the machining process. It has been found that electrical detection of discharges themselves most often does not provide adequate, valid and reliable information to this end. Accordingly, given a particular electrode wire, usually one is compelled to choose safer machining conditions with respect to the possibility of its breakage, or must be satisfied with a removal rate which is much lower than that which ought to be readily obtainable if the wire does not break.

OBJECTS OF THE INVENTION

It is, accordingly, an important object of the present invention to provide a valid, reliable and efficient way of and means for detecting a real tendency toward breakage of the traveling wire electrode and, more generally, varying process conditions in the TW-EDM machining zone.

Another important object of the invention is to provide a new and improved method of and apparatus for electrical-discharge-machining an electrically conductive workpiece with a traveling wire electrode whereby machining is allowed to proceed with maximum efficiency.

A further object of the invention is to provide a novel and improved traveling electrode wire which has greater ability to withstand breakage than and to afford greater removal rate than that obtainable with, the conventional electrode wires in the TW-EDM process.

SUMMARY OF THE INVENTION

In accordance with the present invention there is provided, in a first aspect thereof, a method of machining an electrically conductive workpiece in which a thin, elongate continuous electrode is axially transported from a supply means to travel through a machining zone in the workpiece and to be taken up onto a take-up means and a succession of electrical discharges are effected between the traveling electrode and the workpiece across a machining gap in the presence of a flushing liquid medium to electroerosively remove material from the workpiece while the traveling electrode and the workpiece are relatively displaced transversely to the traveling electrode along a programmed path to advance erosive material removal therealong and in which the electrode is ferromagnetic at least downstream of the cutting zone in its path of travel, which method comprises sensing a magnetic property of the traveling electrode downstream of the machining zone in the path of travel to produce an electrical signal representing a disturbance of the electrical discharges from a normal mode in the machining zone. The said electrical signal is advantageously employed to control at least one machining parameter affecting a distribution of the electrical discharges so as to restore the normal mode in the machining zone.

The invention provides, in a second aspect thereof, an apparatus for machining an electrically conductive workpiece with a thin, elongate continuous electrode, which apparatus comprises means for axially transporting the electrode from supply means along a predetermined path of travel to cause it to travel through a machining zone in the workpiece and to be taken up onto takeup means; means for supplying a flushing liquid medium into a machining gap formed between the traveling electrode and the workpiece; power supply means for effecting a succession of electrical discharges across said machining gap between the workpiece and the electrode traveling through the machining zone to electroerosively remove material from the workpiece; drive means for relatively displacing the traveling electrode and the workpiece transversely to each other along a programmed path to advance erosive material removal therealong; and means disposed downstream of said cutting zone in said predetermined path of travel for sensing a magnetic property of the wire passed from the cutting zone to produce a signal representing a disturbance of the electrical discharges from a predetermined normal machining mode. Means is advantageously provided responsive to said electrical signal for controlling at least one of machining parameter affecting a distribution of the electrical discharges so as to restore said normal machining mode in the machining zone.

The invention also provides, in a third aspect thereof, a thin, elongate continuous electrode element for TW-EDM, which element is composed of a material which consists of 0.05 to 3.0% by weight of at least one rare-earth element and the balance a steel material. The steel material preferably consists of 0.29 to 0.66% by weight carbon, 0.15 to 0.35% by weight silicon, 0.3 to 0.6% by weight manganese, not greater than 0.04% by weight phosphorus, not greater than 0.04% by weight sulfur and the balance iron. Preferably, the electrode is constituted of a core wire composed of a steel material of the composition described and having a layer of a more electrically conductive substance such as copper or brass.

BRIEF DESCRIPTION OF THE DRAWING

These and other features of the present invention as well as advantages thereof will become more readily apparent from the following description when taken with reference to the accompanying drawing in which.

SPECIFIC DESCRIPTION

Figure 1:
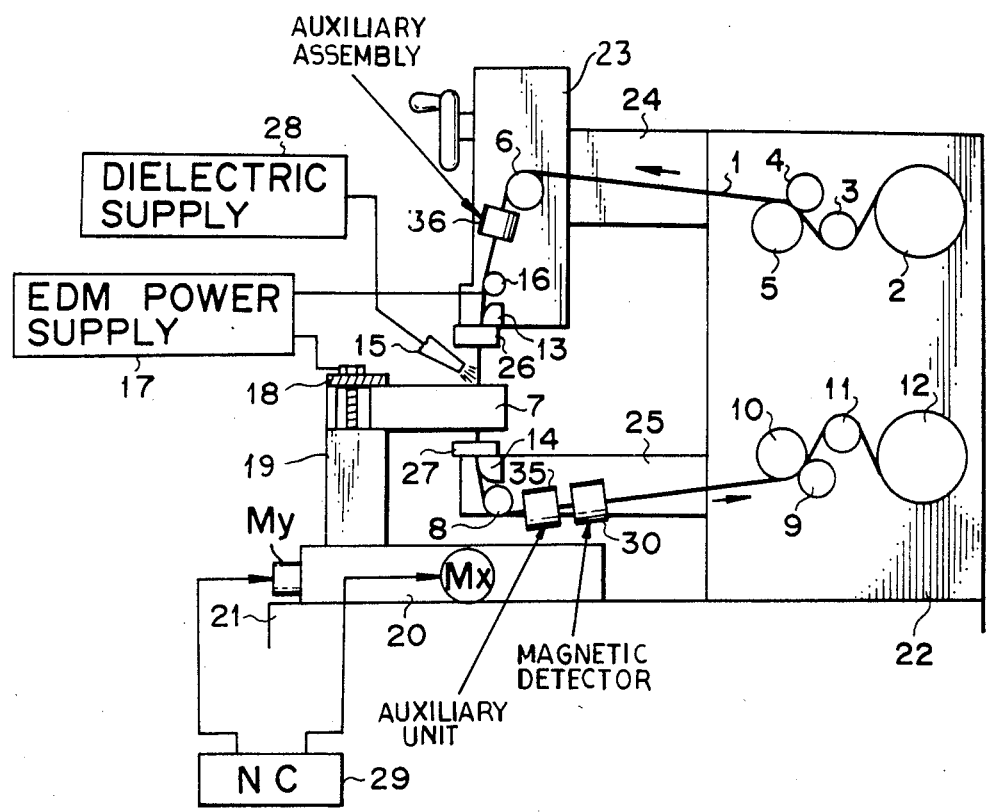
FIG. 1 is a schematic view diagrammatically illustrating a TW-EDM system according to the present invention.

FIG. 1 shows a TW-EDM apparatus incorporating the present invention. An electrode wire 1, typically of a thickness of 0.05 to 0.5 mm, dispensed from supply means in the form of a supply reel 2 is guided to pass over a guide roller 3, between abutting rollers 4 and 5, over a guide roller 6, through a workpiece 7, over a guide roller 8, between abutting rollers 9 and 10 and over a roller 11 for takeup onto a takeup means including a takeup reel 12. The rollers 9 and 10 are driven by means of a motor (not shown) to axially transport the wire 1 from the supply reel 2 onto the takeup reel 12 through a cutting zone in the workpiece 7 between a pair of wire-positioning guide members 13 and 14. The rollers 4 and 5 may also be driven and serve as a brake to give a sufficient tension on the traveling wire 1 so that the wire 1 provides a straight traveling cutting electrode length in electroerosive machining relationship with the workpiece 7 across a machining gap between the positioning guide members 13 and 14. The machining gap is supplied with a flushing liquid medium, e.g. deionized water, from one or more nozzles 15 which communicates with a supply 28 of the pressurized flushing medium. The wire 1 is electrically connected via one or more conducting pins 16 to one terminal of an EDM power supply 17 whose other terminal is electrically connected via an electrically conductive clamp 18 to the workpiece 7. The EDM power supply 17 provides a succession of electrical voltage pulses which may result correspondingly in electrical discharges passed between the traveling wire 1 and the workpiece across the gap to electroerosively remove stock from the workpiece 7. The clamp 18 serves to secure the workpiece 7 to a stand 19 securely mounted on a worktable 20 which is in turn movably mounted on a base 21 of the EDM apparatus. The worktable 20 is driven by a pair of motors Mx, My under commands of a numerical control (NC) unit 29 to displace the workpiece 7 relative to the traveling wire 1 along a programmed path of feed in a horizontal plane to advance the erosive stock removal along that path, thereby forming a corresponding contour in the workpiece 7. The elements 2–5 and 9–12 are shown as mounted on a column 22 standing upright on the base 21. The elements 6, 13 and 16 are mounted on a tool head 23 which is carried on the end of an upper horizontal arm 24 which in turn extends from the column 22 and the elements 8 and 14 are mounted on the end of a lower horizontal arm 25 also extending from the column 22. Electrode-vibrating units 26 and 27, which may be of the type described in U.S. Pat. No. 4,321,450 and U.S. Pat. No. 4,358,655, are also shown to be associated with the wire-positioning guide members 13 and 14, respectively, for imparting high-frequency mechanical vibrations to the wire 1 traveling through the cutting zone.

In accordance with the present invention a magnetic detector 30 is provided downstream of the machining zone in the path of travel of the wire 1 for sensing a magnetic property of the wire 1 passed out of the machining zone, and is here shown as disposed between the guide roller 8 and the drive rollers 9, 10. By monitoring a magnetic property of the wire which has passed out of the machining zone, it has been found that a disturbance of the normal mode in the machining zone can be accurately detected.

In one embodiment of the invention, it should be noted that a conventional non-magnetic or paramagnetic electrode wire such as a copper or base wire may be employed if the workpiece 7 is a ferromagnetic material such as a magnetic steel or a metal carbide cemented with cobalt. It has been found that when an eroding electrical discharge is effected between a point of the wire electrode and the workpiece, thus removing material from the latter, an amount of the removed workpiece material tends to deposit on that point of the wire. Thus, a uniform distribution of electrical discharges over the cutting zone results in a deposit of the magnetic material uniformly distributed on the active wire electrode surface. Accordingly, a disturbance of the desired uniformity of the magnetic property over a length of the wire outgoing from the machining zone indicates a disturbance of the normal mode of electrical discharges in the machining zone.

Figure 2:
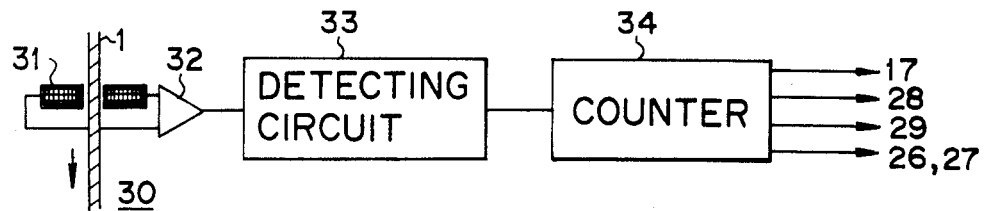
FIG. 2 is a schematic circuit diagram of the magnetic detector used in the system of FIG. 1.

As shown in FIG. 2, the magnetic detector 30 may comprise an annular coil 31 constructed and arranged coaxially with the wire 1 in a magnetic sensing relationship therewith. The detector 30 may also take a magnetic pick-up having a sensing coil and disposed in a magnetic sensing relationship with the wire 1. The output of the sensing coil 31 is fed via an amplifier 32 to a detecting circuit 33 whose output is in turn connected to a counter 34. As the wire 1 is displaced through the sensing coil 31, the detecting circuit 33 produces an output pulse each time the sensing coil 31 fails to detect magnetism during each increment of the displacement of the wire 1. Thus, if the sensing coil 31 continues to fail to detect magnetism, pulses are consecutively produced from the detecting circuit 33. These pulses are connected by the counter 34 and when the number of pulses counted reaches a level preset therein, indicating a disturbance of the electrical discharges from the normal mode in the machining zone, the counter 34 produces a control signal. The control signal may be applied to the EDM power supply 17 to modify one or more of the discharge parameters such as the peak current Ip, the duration $\tau$on and the pulse interval $\tau$off of the discharge pulses, to the fluid supply 15a to increase the pressure and/or flow rate of the flushing medium into the machining zone, to the NC unit 29 to reduce the rate of machining feed, and/or to the electrode vibration units 26, 27 to initiate imparting high-frequency vibrations to the wire 1 traveling across the workpiece 7.

Figure 3:
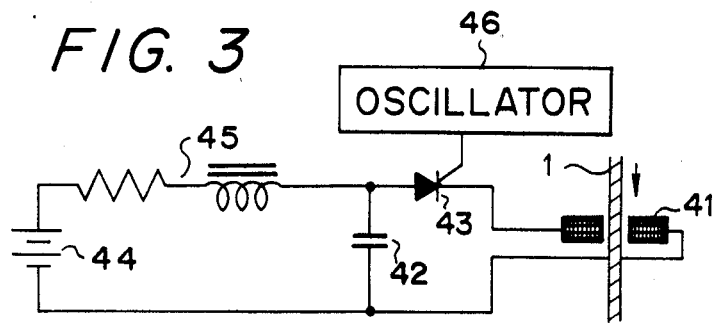
FIG. 3 is a schematic circuit diagram of the magnetizing unit which may be used in the system of FIG. 1.

To facilitate detection of magnetism by the magnetic detector 30, the arrangement of FIG. 1 includes an auxiliary unit 35 which is disposed immediately upstream of the magnetic detector 30 or between the cutting zone and the magnetic detector 30 in the path of wire travel. In the embodiment being described, the auxiliary unit 35 is constituted by a magnetizing unit 40 as shown in FIG. 3. The magnetizing unit 40 shown comprises a magnetizing coil 41 surrounding the wire 1, a capacitor 42 connected with the coil 41 via a switch 43, and a DC source 44 connected with the capacitor 42 via charging impedances 45. The capacitor 42 is alternately charged from the DC source 44 and discharged through the coil 41 as the switch 43 is periodically turned on and off by an oscillator 46 to develop a succession of electrical pulses in the coil 41 and a corresponding pulsed magnetic field therethrough so that a deposit of the magnetic material from the workpiece 7 if present on the wire traveling through the coil 41 may be instantaneously magnetized to a full magnetization level.

Figure 4:
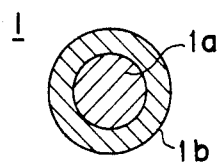
FIG. 4 is a cross-sectional view diagrammatically illustrating a composite wire electrode for use in the system of FIG. 1, comprising a core wire of a steel material having a layer of an electrically conductive metal or alloy coated thereon.
Figure 5:
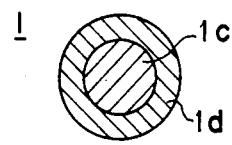
FIG. 5 is a similar view diagrammatically illustrating another composite wire electrode for use in the system of FIG. 1, comprising a core wire of an electrically conductive metal or alloy and having a layer of a ferromagnetic material coated thereon.

Another embodiment of the invention makes use of the wire 1 which is already ferromagnetic prior to entry into the machining zone. Thus, the wire may be composed homogeneously of a ferrous material or steel or may, as shown in FIG. 4, be constituted by a steel or ferrous core wire 1a coated with a layer 1b of metal or alloy of a higher electrically conductivity such as copper, brass or aluminum. Alternately, the wire 1 may, as shown in FIG. 5, be composed of a core wire 1c of such a metal or alloy coated with a layer 1d of a magnetic material such as a ferrite or a mixture of the ferrite with the metal or alloy.

The steel or ferrous material is preferably composed of a hard or piano wire steel, e.g. JIS3506-SWRH62A (Japanese Industrial Standard) or JIS3506-SWRH32A (Japanese Industrial Standard) but may also be of a high-carbon steel, a magnetic stainless steel, a chromium or chromium-molybdenum steel, an iron-manganese-titanium alloy or an iron-chromium-cobalt alloy. Since such a material is tough, the wire 1 can be of especially reduced in thickness. It has been found that wire 1, which has a strength far greater to withstand breakage and affords higher removal rate and machining stability, than the conventional TW-EDM wires, can be provided when the wire 1 or the core wire 1a is composed of a material containing 0.05 to 3% by weight one or more rare-earth elements such as yttrium, samarium, lanthanum or cerium or in the form of misch metal, and the balance a hard or piano steel, preferably the steel which consists by weight of 0.59 to 0.66% carbon, 0.15 to 0.35% silicon, 0.3 to 0.6% manganese, not greater than 0.04% phosphorus, not greater than 0.04% sulfur and the balance iron, or the steel which consists by weight of 0.29 to 0.36% carbon, 0.15 to 0.35% silicon, 0.3 to 0.6% manganese, not greater than 0.04% phosphorus, not greater than 0.04% sulfur and the balance iron.

When such a ferrous wire 1 with a uniform magnetic property over its length is passed through the cutting zone, an electrical discharge while removing stock from the workpiece 7 will also effect a localized heat-treatment of each point on the wire at which it strikes and hence significantly alter the magnetic property of that point. This effect is further enhanced by an instantaneous magnetic field induced by the discharge current in the vicinity of the discharge site. An alternation of the magnetic property will result uniformly over the entire electrode surface of the wire passed out of the cutting zone if the electrical discharges are taking place uniformly over the entire cutting zone. If the electrical discharges are concentrating at one or more points or sites on the wire 1 passing through the cutting zone, this is indicated by a length of the wire out of the cutting zone in which length the magnetic property has not materially altered. Thus, the magnetic detector 30 disposed downstream of the cutting zone is capable of providing at the output of the counter 34 a signal representing a disturbance of electrical discharges from the normal mode in the cutting zone. The alternation of the magnetic property at a discharge-stricken zone of the wire is observed by the fact that each such zone is magnetically hardened. The wire 1 with such magnetically hardened zones passes through the magnetizing unit 35 and then into the magnetic detector 30 in the arrangement of FIG. 1. Thus, the magnetically hardened zones are magnetized to a full magnetization level to develop a greater magnetic flux to facilitate sensing by the magnetic pickup or the sensing coil 31.

Figure 6:
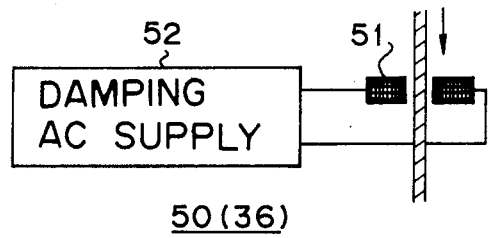
FIG. 6 is a schematic circuit diagram of a demagnetizing unit which may be used in the system of FIG. 1.

The arrangement of FIG. 1 is also shown to include a further or auxiliary assembly 36 disposed upstream of the cutting zone and which may include a demagnetizing unit 50. As shown in FIG. 6, the demagnetizing unit 50 comprises a coil 51 surrounding the ferromagnetic wire 1 traveling into the cutting zone and a current supply for passing a damping AC through the coil 51. The demagnetizing unit 50 is provided to eliminate any magnetization which the wire 1 may have had as supplied with or stored on the reel 2 or as traveling through the supply side of the system in its path of travel, and thus to ensure that the wire 1 traveling into the cutting zone is uniform in the magnetic property over its length.

The auxiliary magnetic assembly 36 may also include a magnetizing unit 40 as shown in and previously described in connection with, FIG. 3. The magnetizing unit 40 in this case is designed to regularly magnetize the ferromagnetic wire 1 traveling into the cutting zone. A series of small magnetic units, each with N and S poles, may be produced in the ferromagnetic wire 1 along its length. The regular distribution of these magnetic units tends to be altered as the wire 1 is passed through the cutting zone while being subjected to eroding electrical discharges. If a disturbance of the electrical discharges is created in the cutting zone, there results a length of the wire 1 in which the original distribution of the small magnetic units remains substantially unchanged. The magnetic detector 30 responds to the occurrence of such a length and provides a control signal which may be used to control one or more machining parameters so as to restore the normal mode in the machining zone, as previously described.

What is claimed is:

1. A method of machining an electrically conductive workpiece in which a thin, elongate continuous electrode is axially transported from supply means to travel through a machining zone in the workpiece and to be collected into takeup means and a succession of electrical discharges are effected between the traveling electrode and the workpiece across a machining gap in the presence of a flushing liquid medium to electroerosively remove material from the workpiece while the traveling electrode and the workpiece are relatively displaced transversely to the electrode along a programmed path to advance erosive material removal therealong and in which the electrode is ferromagnetic at least downstream of the machining zone in its path of travel, the method comprising the step of:
sensing a magnetic property of said traveling electrode downstream of said machining zone to produce an electrical signal representing a disturbance of said electrical discharges from a normal mode in said machining zone.

2. The method defined in claim 1, further comprising the step of controlling, in response to said electrical signal, at least one machining parameter affecting a distribution of the electrical discharges so as to restore said normal mode in said machining zone.

3. The method defined in claim 1 or claim 2 wherein said workpiece is composed of a ferromagnetic material and said electrode is essentially paramagnetic upstream of said cutting zone, further comprising the step of rendering said electrode ferromagnetic through said machining zone by forming a deposit of ferromagnetic material in a region of a said electrical discharge on said electrode in said machining zone.

4. The method defined in claim 3, further comprising the step of, prior to sensing said magnetic property, magnetizing said electrode passing out of said machining zone.

5. The method defined in claim 1 or claim 2 wherein said electrode is composed at least in part of ferromagnetic material.

6. The method defined in claim 5 wherein said electrode comprises a core element composed of said ferromagnetic material and having a layer of metal or alloy coated thereon which is higher in electrical conductivity than said ferromagnetic material.

7. The method defined in claim 5 wherein said electrode comprises a core element composed of metal or alloy which is essentially paramagnetic and having a coating thereon which is at least in part composed of said ferromagnetic material.

8. The method defined in claim 5 wherein said ferromagnetic material consists of 0.05 to 3% by weight of at least one rare-earth element and the balance a steel material.

9. The method defined in claim 5, further comprising the step of, prior to sensing said magnetic property, magnetizing said electrode passing out of said machining zone.

10. The method defined in claim 5, further comprising the step of demagnetizing said ferromagnetic electrode prior to entry into said machining zone.

11. The method defined in claim 10, further comprising the step of magnetizing said demagnetized ferromagnetic electrode prior to entry into said machining zone.

12. The method defined in claim 5, further comprising the step of magnetizing said ferromagnetic electrode prior to entry into said machining zone.

13. An apparatus for machining an electrically conductive workpiece with a thin, elongate continuous electrode, comprising:
means for axially transporting said electrode from supply means along a predetermined path of travel to cause it to travel through a machining zone in the workpiece and to be taken up onto takeup means;

means for supplying a flushing liquid medium into a machining gap formed between the traveling electrode and the workpiece in said machining zone;

power supply means for effecting a succession of electrical discharges across said gap between the workpiece and the electrode traveling through said machining zone to electroerosively remove material from said workpiece;

drive means for relatively displacing said traveling electrode and the workpiece transversely to said electrode along a programmed path to advance erosive material removal therealong; and means disposed downstream of said machining zone in said predetermined path of travel for sensing a magnetic property of said electrode passing out of said machining zone to produce a signal representing a disturbance of the electrical discharges from a predetermined machining mode in said machining zone.

14. The apparatus defined in claim 13, further comprising means responsive to said sensing means for controlling at least one machining parameters affecting a distribution of electrical discharges in said machining zone so as to restore said predetermined machining mode therein.

15. The apparatus defined in claim 13 or claim 14, further comprising means disposed between said machining zone and said sensing means in said predetermined path of travel for magnetizing said electrode passing out of said machining zone.

16. The apparatus defined in claim 13 or claim 14, further comprising means disposed upstream of said machining zone in said predetermined path of travel for demagnetizing said electrode prior to entry into said machining zone.

17. The apparatus defined in claim 13 or claim 14, further comprising means disposed upstream of said machining zone in said predetermined path of travel for magnetizing said electrode so as to form a predetermined magnetic pattern along its length prior to entry into said machining zone.

* * * * *